(12) United States Patent
Daniel (10) Patent No.: US 8,799,672 B1
(45) Date of Patent: Aug. 5, 2014

(54) APPARATUS, SYSTEM AND METHOD FOR REVIEWING GAME INFORMATION BY REFEREES

(75) Inventor: Isaac Sayo Daniel, Miami, FL (US)

(73) Assignee: The F3M3 Companies, Inc.

( * ) Notice: Subject to any disclaimer, the term of this patent is extended or adjusted under 35 U.S.C. 154(b) by 727 days.

(21) Appl. No.: 12/640,794

(22) Filed: Dec. 17, 2009

Related U.S. Application Data

(63) Continuation-in-part of application No. 12/286,476, filed on Sep. 30, 2008, now Pat. No. 8,126,143, and a continuation-in-part of application No. PCT/US2008/013755, filed on Dec. 16, 2008, and a continuation-in-part of application No. 12/317,640, filed on Dec. 23, 2008, and a continuation-in-part of application No. 29/346,711, filed on Nov. 4, 2009, now Pat. No. Des. 628,749.

(51) Int. Cl.
*G06F 11/30* (2006.01)
*G06F 12/14* (2006.01)
*G06F 21/72* (2013.01)
*G06F 21/10* (2013.01)
*G06F 1/00* (2006.01)
*H04B 1/38* (2006.01)
*H04L 9/08* (2006.01)
*H04L 29/06* (2006.01)

(52) U.S. Cl.
CPC ............... *G06F 21/72* (2013.01); *G06F 21/10* (2013.01); *G06F 2221/2107* (2013.01); *H04L 9/08* (2013.01); *H04L 63/0428* (2013.01)
USPC .......... 713/189; 713/176; 713/324; 455/90.2; 455/90.3

(58) Field of Classification Search
CPC . G06F 21/72; G06F 21/10; G06F 2221/2107; H04L 9/08; H04L 63/0428
USPC .............. 128/201.19; 2/909, 205; D24/110.3; 713/168–174, 182–186, 202; 709/225, 709/229; 726/2–8
See application file for complete search history.

(56) References Cited

U.S. PATENT DOCUMENTS

2006/0057972 A1\* 3/2006 Wikel et al. .................. 455/90.3
2009/0132825 A1\* 5/2009 Mohanty ....................... 713/176
2009/0215432 A1\* 8/2009 Matsuoka ................... 455/412.2
2009/0276855 A1\* 11/2009 Anderson et al. ............... 726/26

\* cited by examiner

*Primary Examiner* — Evans Desrosiers
(74) *Attorney, Agent, or Firm* — Carol N. Green, Esq.

(57) ABSTRACT

The present disclosure relates generally to an apparatus, system and method, and more particularly to an apparatus, system and method providing for referees to communicate with each other and/or other officiators on or off the field using an article of headwear equipped with communication means attached thereto, where the communication means is in communication with at least one portable remote terminal and as such the referee can dynamically receive electronic communications concerning video replays, field incidents on or off the field, play calls, signal calls, etc., from other referees on/or off the field or court.

34 Claims, 11 Drawing Sheets

FIG. 7 ns of the afore-mentioned patent applications are incorporated by reference as if fully stated herein.

APPARATUS, SYSTEM AND METHOD FOR REVIEWING GAME INFORMATION BY REFEREES

PRIORITY CLAIM

This patent application is a continuation-in-part of, and claims priority to: United States Non-Provisional patent application Ser. No. 12/286,476 titled An Apparatus and Method for Improving In-Game Communications During a Game filed Sep. 30, 2008 now U.S. Pat. No. 8,126,143; PCT Application Serial No. PCT/US2008/013755 titled An Apparatus and Method for Improving In-Game Communications During a Game filed on 16 Dec. 2008; United States Non-Provisional patent application Ser. No. 12/317,640 titled A System and Method for Improving Game Communications During a Game filed Dec. 23, 2008; and U.S. Design patent application Ser. No. 29/346,711 titled An Article of Headwear filed Nov. 4, 2009 now U.S. Pat. No. d,628,749. The entire disclosures of the afore-mentioned patent applications are incorporated by reference as if fully stated herein.

FIELD OF THE INVENTION

The present disclosure relates generally to an apparatus, system and method, and more particularly to an apparatus, system and method providing for referees to communicate with each other and/or other officiators on or off the field using an article of headwear equipped with communication means attached thereto, where the communication means is in communication with at least one portable remote terminal and as such the referee can dynamically receive electronic communications concerning video replays, field incidents on or off the field, play calls, signal calls, etc., from other referees on/or off the field or court.

BACKGROUND

Referees who officiate heavy contact sports consistently place themselves in danger of being injured by the players. These injuries run the gamut from contusions to serious injuries like concussions, neck and/or back injuries, etc. Notably, the players are generally armed with like concussions, neck and/or back injuries, etc. Notably, the players are generally armed with significant protective gear for their bodies and/or head, yet the referees for the most part, do not wear any protective gear. To mitigate field injuries, some referees carefully position themselves in certain locations to avoid and/or minimize physical contact with the players. However, in order to be effective, referees need unrestricted movements to view all the plays, fouls, players' disorderly conduct on or off the field, etc., in order to make their rulings. Thus, there is a need for an apparatus, system and method for protecting referees located on or off the field or court, from head injuries in a manner that does not restrict their movements or impair their ability to referee a game.

Refereeing is often restricted by the referees' inability to capitalize on technological advancements in the electronics and communications field as the methods of making rulings in sports, such as baseball and football, still rely heavily on the referee's sensory perception, such as sight and sound. This has proven to be an inexact science, and so more and more referees are using replay technology to make rulings on the field, or to review rulings that have already been made. However, replay technology as it currently exists is inefficient, since it requires additional time for the referees to convene, approach a viewing booth, view the replay, and to decide on a new ruling, or whether a prior ruling on the field will stand. Thus, there is a need for more efficient system and methods for making rulings on sports fields as the prior art have thus far proven to be unreliable and inefficient.

Accordingly, the various embodiments and disclosures described herein satisfies these long felt needs and solves the limitations of the prior art in a new and novel manner.

SUMMARY

An object of the present invention is using an apparatus, system and method for receiving and reviewing speedy, in-game communications concerning game information, e.g. game plays, on or off court incidents, fouls, etc., that overcomes the limitations of the prior art.

Another object of the present invention is to provide a portable remote terminal in communication with a communications unit attached to an article of headwear, where the portable remote terminal is configured for displaying game information, which includes but is not limited to prior referee calls, image, a video, a sound, a text, a play call, a referee ruling, an instant replay, or any other field event on or off the field and/or court (collectively "on the field").

Another object of the present invention is to provide an article of headwear with communication means that may be detachable, semi-permanently affixed and/or permanently affixed to an article of headwear.

Still yet another object of the present invention is to provide an article of headwear with communications means in communication with a portable remote terminal ("PRT"), where the PRT is configured for receiving video replays of past plays, signal calls from another referee, line judges or others, and/or on or off court incidents.

The present invention relates generally to an apparatus, system and method and more particularly to an apparatus comprising of: an article of headwear; and at least one communications unit attached to the article of headwear. Article of headwear may be any one or more of the following: a helmet, a hat, a headband, a mask, a cap, a hood, a referee's helmet, and goggles. In an exemplary embodiment, the article of headwear comprises of a referee helmet; and a communications unit attached to the referee helmet. The at least one communications unit is affixed to the at least one article of headwear in any one of the following manner: detachably, semi-permanently or permanently.

The at least one communications unit is in communication with at least one PRT. A PRT may comprise of a cell phone, a portable computer, a personal digital assistant ("PDA"), a laptop computer, a tablet personal computer, a portable screen, a portable processing device and/or any other WLAN communication devices that are readily used in the arts to transmit and/or receive wireless communications. Both the PRT and the at least one communications unit are configured with means for communicating with each other either wirelessly or wired.

The at least one communications unit comprises of: at least one microphone connected to the at least one communications unit; and at least one speaker connected to the at least one communications unit. The at least one communications unit is operative to transmit and receive information via a wireless protocol and is operative to communicate using a short range wireless protocol, wherein the short range wireless protocol includes any one or more of the following: WiHLoN™, Bluetooth®, ZigBee, and 802.11 series.

In one embodiment of the invention, the at least one communications unit is configured for communicating with a secondary communications unit attached to a secondary article of headwear and/or a secondary PRT. In this manner, a referee can communicate with another referee wearing a similarly configured apparatus.

The system comprises of at least one article of headwear; at least one communications unit attached to the at least one article of headwear; and at least one PRT in communication with the at least one communications unit. In one embodiment, system may also comprise of at least one camera operative to capture at least one image of game information to be viewed on at least one portable remote unit. Game information may include any one or more of the following: an image, a video, a sound, a text, a play call, a referee ruling, an instant replay, or any other field event on or off the field and/or court (collectively "on the field").

The at least one PRT is in communication with the at least one communications unit in any of the following manner: wired or wirelessly. The at least one communications unit and the PRT are both adapted to communicate using a short range wireless protocol, wherein the short range wireless protocol includes any one or more of the following: WiHLoN™, Bluetooth®, ZigBee, and 802.11 series. The at least one PRT includes but is not limited to: a central processing unit or a portable processing unit and at least one display means. The at least one PRT further comprises of computer executable instructions readable by a processor and operative to transmit and receive game information. The at least one at least one display means is configured for displaying game information in any one or more of the following formats: visual, text or audio.

Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the apparatus, system and methods may be derived by referring to the detailed description and claims when considered in connection with the Figures, wherein like reference numbers refer to similar items throughout the Figures.

DETAILED DESCRIPTION OF PREFERRED EMBODIMENTS

Further objectives and advantages of the apparatus, systems and methods disclosed herein may be derived by referring to the detailed description and claims when considered in connection with the Figures, wherein like reference numbers refer to similar items throughout the Figures.

Figure 1A:
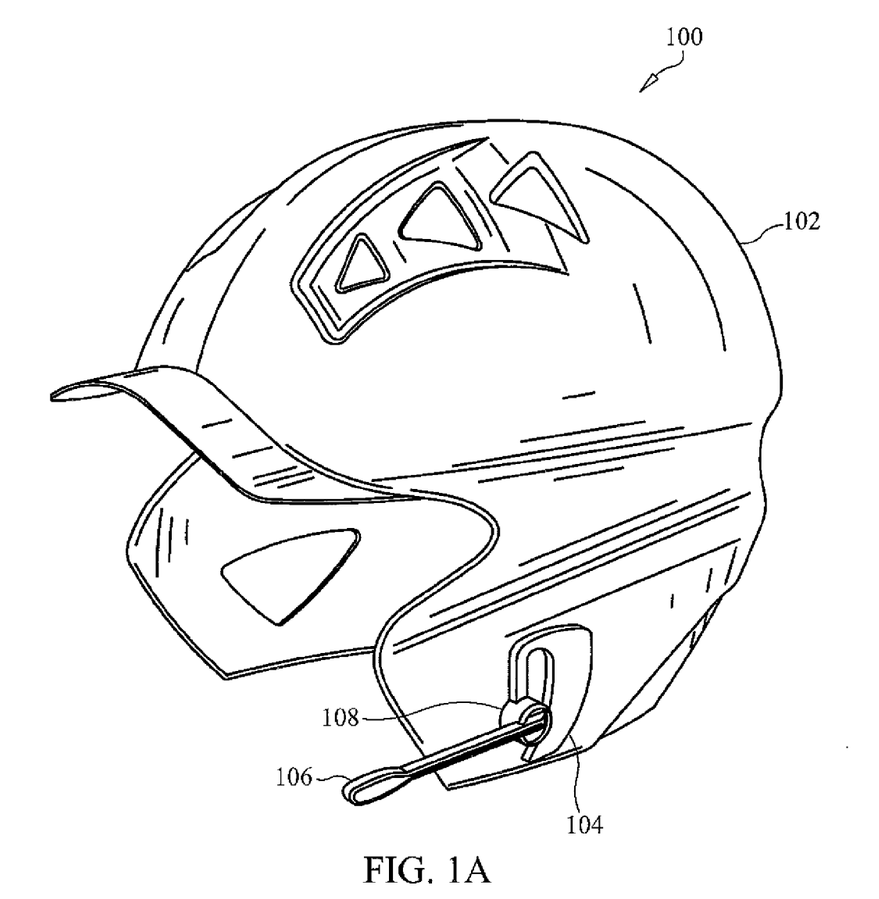
FIG. 1A shows an apparatus in accordance with an exemplary embodiment.

FIG. 1A shows an apparatus 100 in accordance with one embodiment. Apparatus 100 comprises of an article of headwear 102 and at least one communications unit 104 attached to the article of headwear 102. The article of headwear 102, includes any one or more of the following: a helmet, a hat, a headband, a mask, a cap, a hood, a referee's helmet, goggles and any other article of headwear 102 that is known and used in the arts. Illustratively, as shown in FIG. 1A, the article of headwear 100 comprises of a referee's helmet and a communications unit 104 attached to the referee's helmet. The at least one communications unit 104 comprises of: at least one microphone 106 connected to the at least one communications unit 104; and at least one speaker 108 connected to the at least one communications unit 104.

The at least one communications unit 104 comprises of means for communicating wired and/or wirelessly and is operative to communicate, i.e. transmit and receive information, using a short range wireless protocol, where the short range wireless protocol includes any one or more of the following: WiHLoN™, Bluetooth®, ZigBee, and 802.11 series. The at least one communications unit 104 is also configured for communicating with a secondary communications unit 104' attached to a secondary article of headwear 100' and/or a secondary portable remote terminal.

Figure 1B:
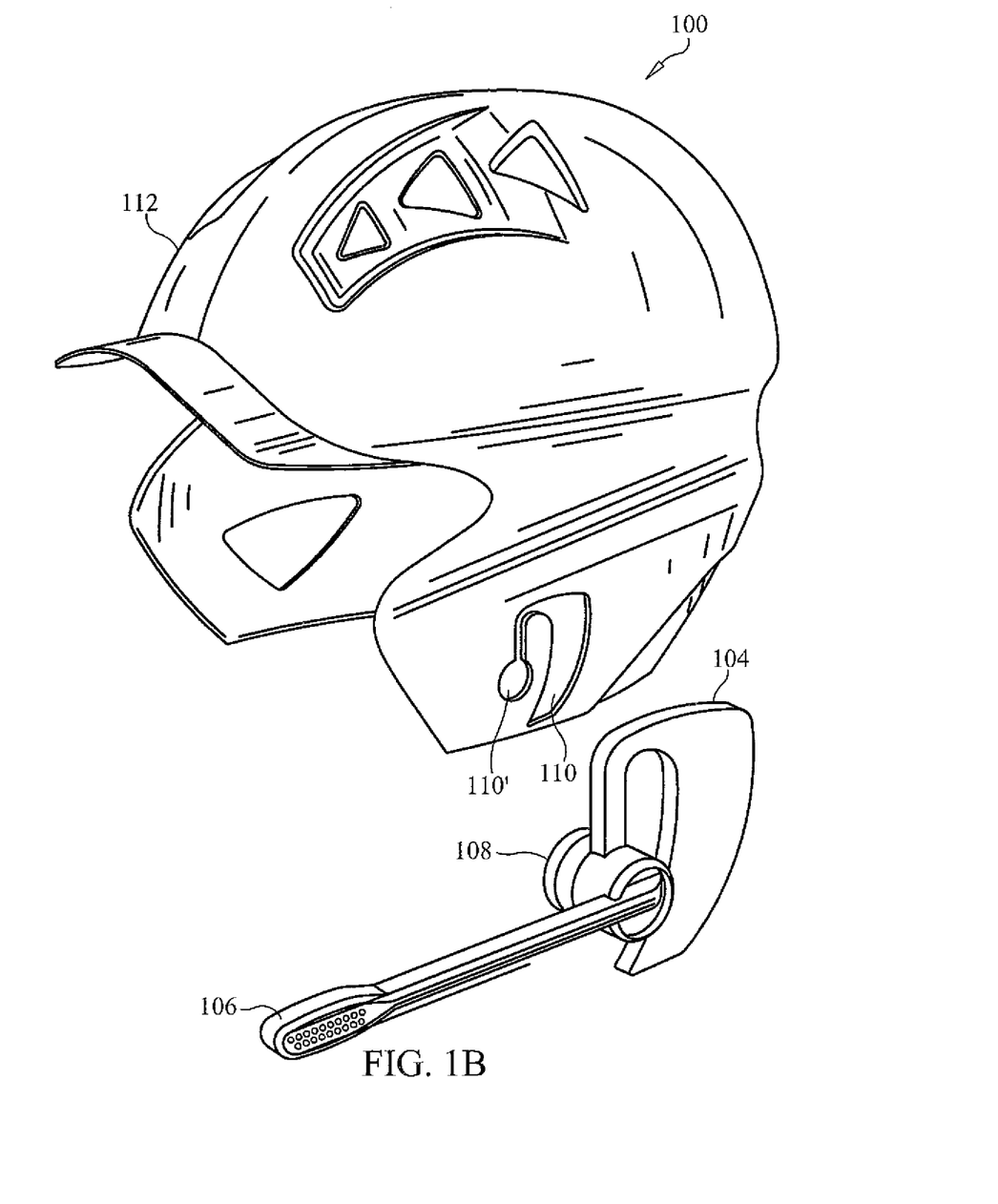
FIG. 1B shows a detachable communications unit of the apparatus in accordance with an embodiment.
Figure 1C:
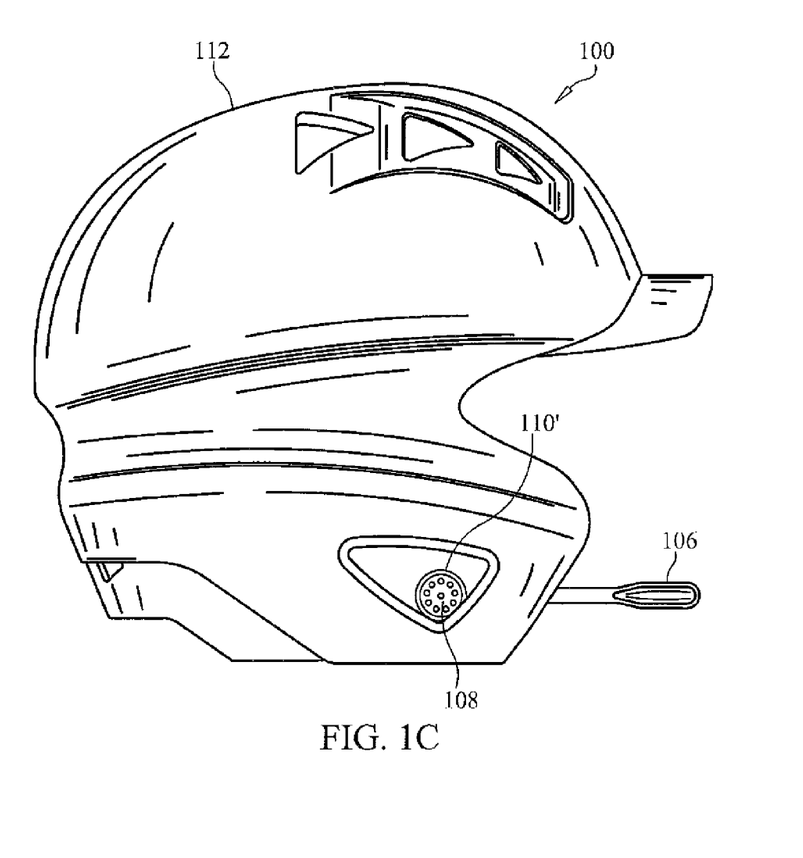
FIG. 1C shows a side view of the apparatus in accordance with an embodiment.

FIG. 1B shows a detachable communications unit 104 of the apparatus 100 in accordance with an embodiment. The at least one communications unit 104 is affixed to the at least one article of headwear 100 in any one of the following manner: detachably, semi-permanently and/or permanently. Illustratively as shown in FIG. 1B, the at least one communications unit 104 may be detachably connected to the at least one article of headwear 100. Such detachability may be achieved by providing at least one aperture 110, wherein the communications unit 104 may be inserted. Aperture 110 may be at least one slot of any shape or size, positioned on the article of headwear's exterior 112, configured to receive the communications unit 104. Illustratively, as seen in FIG. 1B, the at least one aperture 110 is curved to track the shape of the communications unit 104. Article of headwear's exterior 112 may include a secondary aperture 110', which may comprise of an opening to receive the speaker 108 within, as seen in FIG. 1C. In an alternate embodiment, the at least one communications unit 104 may be permanently or semi-permanently affixed to the at least one article of headwear's exterior 112.

The article of headwear 100 may include securing means for securing the at least one communications unit 104 to the article of headwear 100. The means for securing the at least one communications unit 104 may include but is not limited to, a buckle, a button, a magnet, a thread, a clip, a hooks-andloops fastener, a zipper, glue, sticky tack, a push button fastener, a protrusion extending from the article of headwear's exterior 112 capable of locking the communications unit 104 within, or any other means of securing an object to another as known an use in the arts.

In one embodiment, the article of head wear 100 may include a soundproofing element 114 (not shown). Soundproofing element 114 (not shown) may be a noise insulating material, which may include but is not limited to soundproofing foam, such as memory foam and acoustic foam, polystyrene foam, neoprene, or silicone or any other soundproofing materials that are known and used in the arts. In another embodiment, soundproofing element 114 (not shown) may be formed from a solid material, including, but not limited to, plastic, resin, metal, carbon fiber, wood, or fiberglass.

System Level Overview

Figure 2A:
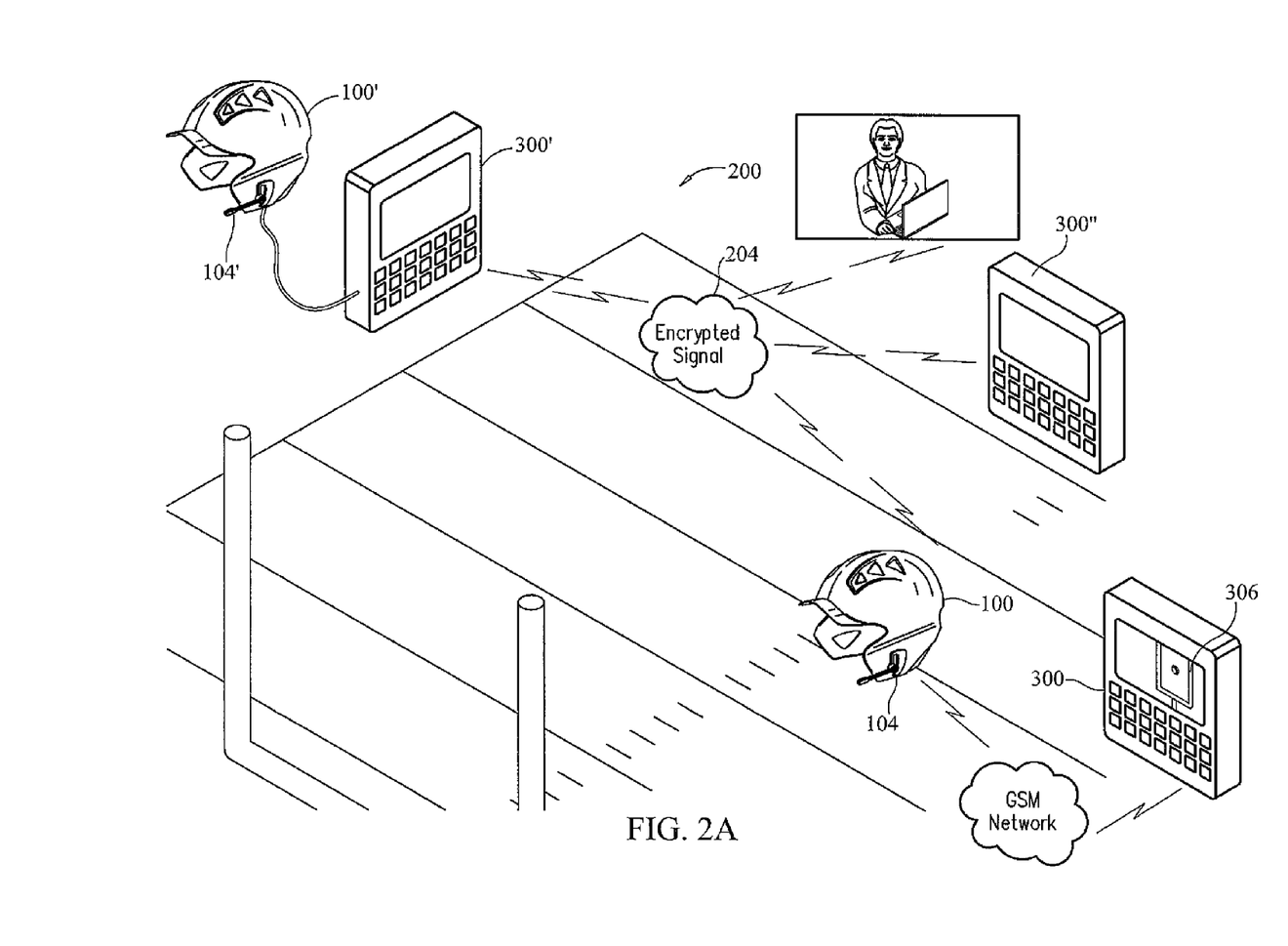
FIG. 2A shows an exemplary system in accordance with an embodiment.

FIG. 2A shows a system 200 in accordance with one embodiment. System 200 comprises of at least one article of headwear 100; at least one communications unit 104 attached to the at least one article of headwear 100; and at least one PRT 300 in communication with the at least one communications unit 104. Illustratively, the article of headwear 100 is a referee's helmet. However, the article of headwear 100 may comprise of any one of the following: a helmet, a hat, a headband, a mask, a cap, a hood, a referee's helmet, and goggles. The at least one communications unit 104 comprises of: at least one microphone 106 connected to the at least one communications unit 104; and at least one speaker 108 connected to the at least one communications unit 104.

The at least one communications unit 104 is affixed to the at least one article of headwear 100 in any one of the following manner: detachably, semi-permanently and/or permanently. The at least one communications unit 104 is adapted to communicate wirelessly using a short range wireless protocol, wherein the short range wireless protocol includes any one or more of the following: WiHLoN™, Bluetooth®, ZigBee, and 802.11 series using a Global System for Mobile ("GSM") communications networks. Communications unit 104 may also be configured to communicate wirelessly with a secondary communications unit 104' attached to a secondary article of headwear 100', and/or at least one PRT 300. In one embodiment, the communications unit 104 is configured for communicating in a wired manner with at least one PRT 300.

Figure 3:
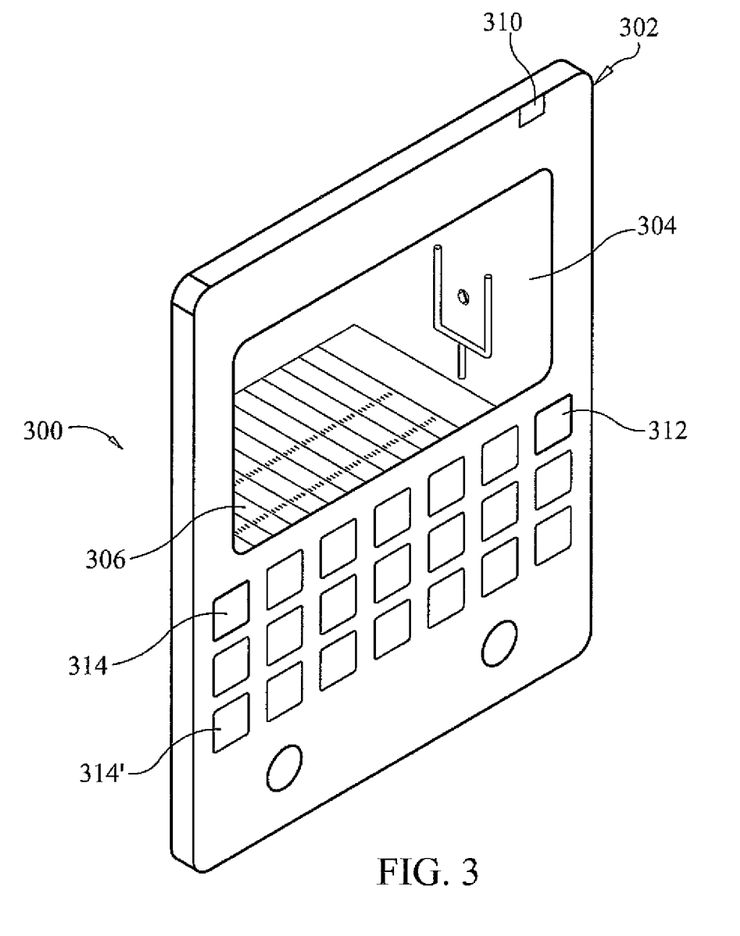
FIG. 3 shows the PRT in accordance with one embodiment.

Referring to FIG. 3, which shows the PRT 300 in accordance with one embodiment, PRT 300 may include at least one processor 302 positioned within, and at least one display means 304, where the processor 302 is operative to transmit and receive game information 306 to be viewed via the PRT's display means 304. PRT 300 may comprise of a cell phone, a portable computer, a personal digital assistant ("PDA"), a laptop computer, a tablet personal computer, a portable screen, a portable processing device and/or any other WLAN communication devices that are readily used in the arts to transmit and/or receive wireless communications.

Processor 302 may be any type of processor, such as, but not limited to, a central processing unit (CPU), a microprocessor, a video processor, a front end processor, a coprocessor, a single-core processor, a multi-core processor, and any other processor 302 used in the arts. Processor 302 may include computer executable instructions readable by the processor 302 and operative to transmit and receive game information 306.

In a further embodiment, PRT's processor 302 may include communications means 308 (not shown), i.e. a transmitting means and/or receiving means for transmitting and/or receiving electronic signals from at least one processing unit located on/or off the field. PRT's processor 302 may include a combined wireless transceiver with integrated radio and shared antennae, e.g. WiHLoN™, ZigBee, Blue Tooth, 802.11 series, or any other short range wireless protocol that is well known and used in the arts, and other future short range wireless protocol suitable for transmitting and receiving data over a short distance using for example a GSM network. Preferably, PRT's processor 302 includes a combined wireless transceiver like a ZigBee transceiver with an integrated radio and shared antennae.

In one embodiment, display means 304 is a portable display means, such as, but not limited to, at least one PRT 300, and may include a screen, such as a liquid crystal display (LCD) screen, a light emitting diode screen (LED), plasma, touch screen or other types of displays that are well known and used in the arts. In yet further embodiments, display means 304 may include a control means, such as, but not limited to, a keyboard, a mouse, a touch screen, a stylus, and the like. In one embodiment, PRT's display means 304 is configured for displaying game information 306 in any one or more of the following formats: graphic images, text and/or audio to one, a plurality or all referees and/or other officials. Game information 306 may include any one or more of the following in audio, text and/or graphic images: an image, a video, a sound, a text, a play call, a foul, a referee ruling, and an instant replay, or any other field event on the field. In one embodiment, display means 304 may be automatically activated upon receipt of game information 306, where display means 304 may display a virtual or an actual image of an instant replay of a field event. In other embodiments, display means 304 may be included and/or incorporated in the processing unit 304.

In one embodiment, PRT 300 further includes an alarm means 310. Such alarm means 310 may include, but is not limited to, a vibrating alarm, a sounding or audible alarm, or a visual alarm, e.g. a flashing light as shown in FIG. 3, alerting the referee of an incoming transmission of game information 306. As such, a referee may be alerted to incoming transmissions from other referees via the alarm means 310. In other embodiments, alarm means 310 may be included and/or incorporated in PRT's processor 302.

PRT 300 may include an activation button 312, which may be used to at least one of, activate and/or reactivate display means 304, e.g. a touch screen, for viewing the game information 306 on the display means 304, or for transmitting game information 306 to another secondary PRT 300'. PRT 300 may comprise of other programmable buttons 312, 312' that may be programmed to perform any one or more of the system functions of the PRT 300, e.g. transmit or receive game information 306 to/from other PRTs 300, 300," used to select intended recipient(s) of game information 306, and the like.

Referring back to FIG. 2A, PRT 300 is configured for wireless communications with other PRTs 300', 300" on or off the field. Once activated, PRT's communications means 308 (not shown) is operative for transmitting an electronic signal 202 (not shown) containing the game information 306, where PRT's processor 302 encrypts the game information 306 creating an encrypted signal 204 containing the game information 306 for transmission to a secondary PRT's communications means 308' (not shown) for the receipt thereof.

There may be one or more recipients of the transmitted encrypted signal 204 containing the game information 306, which may require the referee transmitting the game information 306 to select one, a plurality or all as the intended recipient(s). As such, PRT's processor 302 receives the selected recipient(s) for targeted transmission. In either event, the transmitting PRT's communications means 308 (not shown) transmits an encrypted signal 204 containing the game information 306 to a secondary PRT 300', which receives the encrypted signal 204 containing the game information 306, decrypts the encrypted signal 204 containing game information 306 and displays the decrypted game information 306 on the receiving PRT's display means 304'. The at least one communications unit 104 may act as a relay transmitter of the encrypted signal 204 containing the game information 306, where the encrypted signal 204 may be routed via the communications unit 104 over a GSM network to secondary PRT(s) 300', 300".

In one embodiment, a referee may be wearing an apparatus 100 that is in communications with a secondary PRT 300', equipped with software and hardware adapted to communicate wirelessly with secondary PRTs 300, 300' on or off the field.

In another embodiment, the referee receiving the game information 306 may not be wearing an apparatus but has in his/her possession a secondary PRT 300". This referee is still able to receive the game information 306, despite not having the ability to communicate with other referees via a communications unit 104 as the encrypted signal containing the game information 306 may be transmitted through a secondary PRT 300' and/or a secondary communications unit 104'.

Figure 2B:
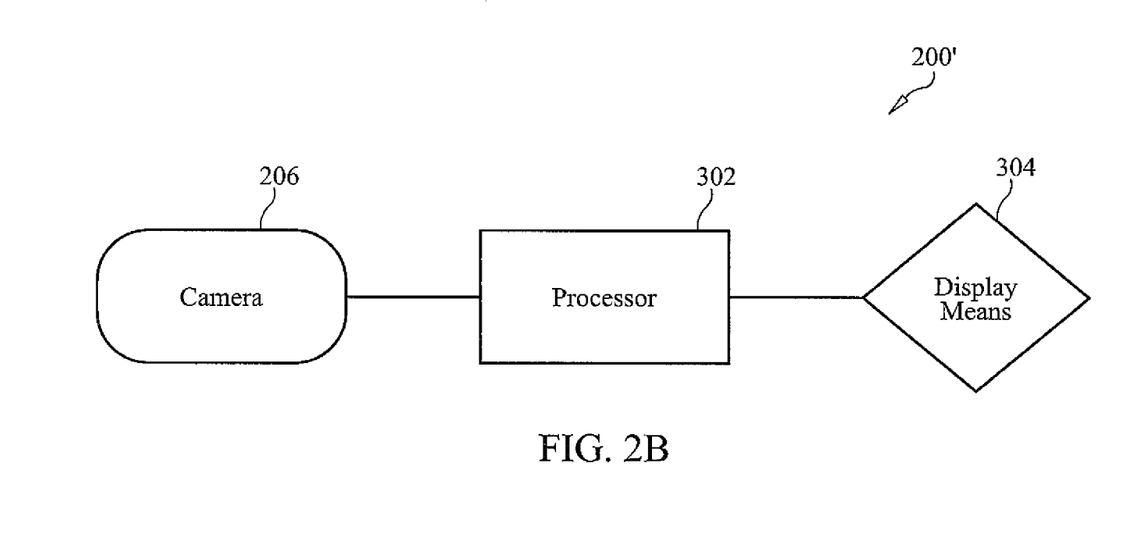
FIG. 2B shows an exemplary system in accordance with another embodiment.
Figure 2C:
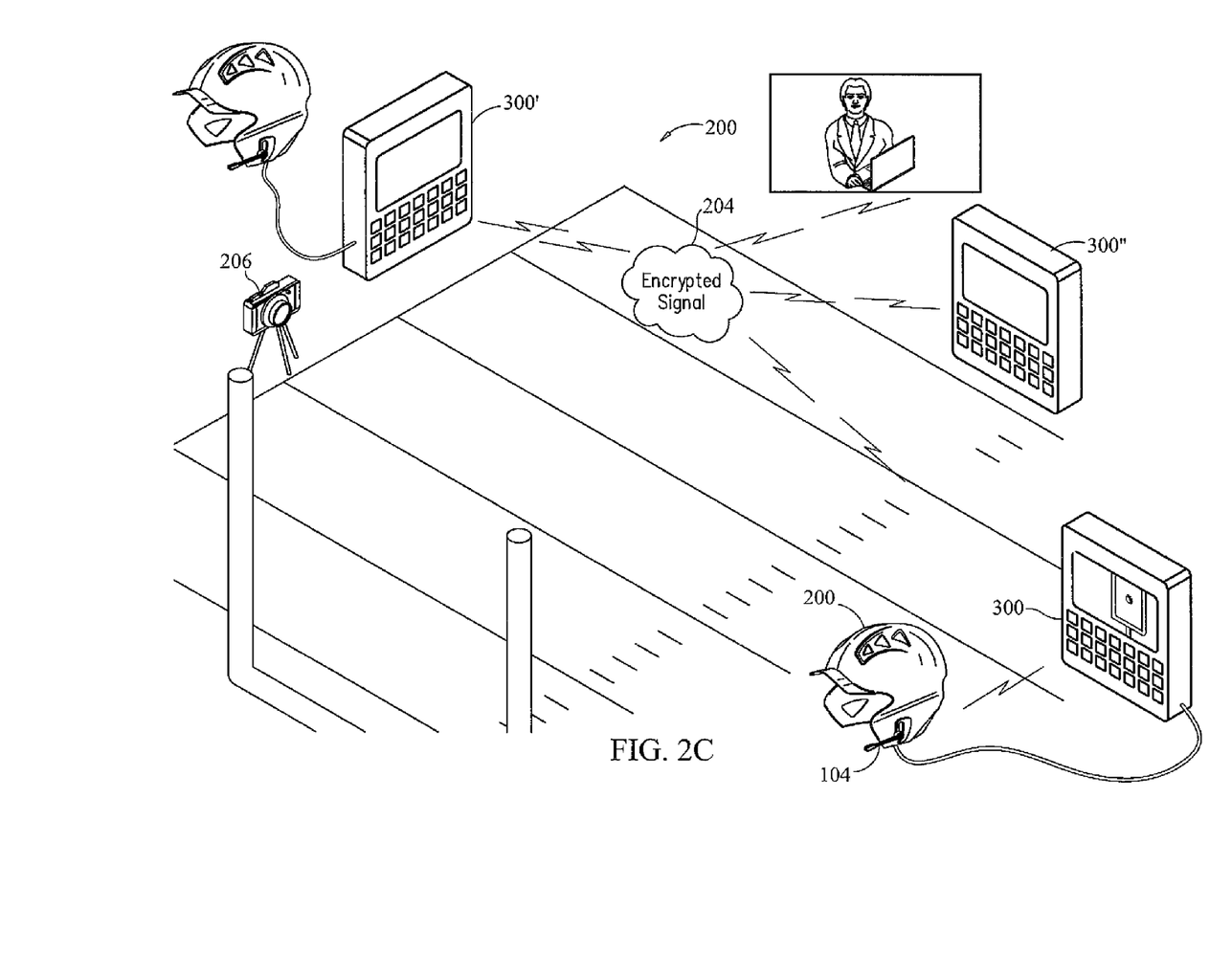
FIG. 2C shows an exemplary system in accordance with another embodiment.

FIGS. 2B & 2C show exemplary systems 200', 200" in accordance with other embodiments. In one embodiment, system 200' comprises at least one camera 206, at least one processor 302 operative to communicate with the at least one camera means 208, and at least one display means 304 operative to communicate with the at least one processor 302.

In some embodiments, camera 206 may be any kind of camera, including, but not limited to, a video camera, a still picture camera, an analog camera, a digital camera, a high speed sports camera, and the like. In other embodiments, camera 206 is capable of capturing an image of game information 306, which includes movements at high, medium or slow speeds, e.g. players and/or balls are travelling at varied speeds and/or great distances. Camera 206 may be operative to capture certain game information 306, e.g. an image, plays, on or off court incidents, a video, a sound, a play call, a foul, and the like during a sports game, and then relay those captured game information 306 to a display means 304 via a processor, such as processor 302. In some embodiments, there may be a plurality of cameras 206, 206' to capture samples of game information 306 at multiple angles. Illustratively, as seen in FIG. 2C, camera 206 may be positioned on the sidelines. However, it is understood that camera 206 may be located within a viewer's box, skybox, or stadium box or any other convenient location to capture an image of game information 306.

In some embodiments, display means 304 is electronically connected to processor 302. In other embodiments, display means 304 is wirelessly connected to processor 302. Display means 304 may display a captured image of game information 306 from camera 206. Display means 304 may also display a computer model based on a captured image of game information 306 from camera 206. In some embodiments, display means 304 may receive a captured image of game information 306, which has been captured by camera 206 and relayed to display means 304 via processor 302.

In some embodiments, processor 302 may be any type of processor, such as, but not limited to, a central processing unit (CPU), a microprocessor, a video processor, a front end processor, a coprocessor, a single-core processor, a multi-core processor, and the like. Processor 302 may also be a video processor. In various embodiments, processor 302 may be operative to receive a captured image of game information 306 from camera 206, and relay the a captured image of game information 306 to display means 304, which may be located on or off the field. In some embodiments, processor 302 may be positioned on or in camera 206. In other embodiments, processor 302 may be positioned on or in display means 304. In yet other embodiments, processor 302 may be positioned remotely (e.g. in a viewer's box, skybox, or stadium box in a stadium). In some embodiments, processor 302 may be electronically connected to camera 206, or display means 304, or both, while in other embodiments, processor 302 may be wirelessly connected to camera 206, or display means 304, or both.

In yet another embodiment, system 200' may further comprise computer executable instructions (not shown) readable by processor 302 and operative to capture at least one image of game information 306 from the camera 206. The computer executable instructions may be loaded directly on the processor 302, or may be stored in a storage means, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions may be any type of computer executable instructions, which may be in the form of a computer program, the program being composed in any suitable programming language or source code, such as C++, C, JAVA, JavaScript, HTML, XML, and other programming languages.

In yet another embodiment, the computer executable instructions are operative to transmit the captured image of game information 306 from camera 206 to display means 304. The computer executable instructions may also be operative to take a snap shot, or a still image, from a video captured by camera 206. In a further embodiment, the computer executable instructions may be operative to convert the captured image into a computer model, wherein the computer model may be manipulated into a computer model. The computer model may be a two dimensional model (2D), three dimensional model (3D), or four dimensional model (4D), which would include the dimension of time (e.g. an animatable computer model). In yet a further embodiment, the computer model may be manipulated on the display means 304 by using the control means to manipulate the model and/or image which is being displayed on the display means 304. Manipulation may include demarcating boundaries to determine whether a foul has occurred or replaying the movements of a ball going out of bounds, and the like.

In one embodiment, the computer executable instructions may include image recognition software. In a further embodiment, the computer executable instructions may be operative to analyze the captured image of game information 306 from camera 206, and create, or generate, a computer model based on the captured image, and then recognize the subjects of the image (e.g. players, etc.) and convert those subjects into manipulatable objects in the computer model.

Methods

Figure 4:
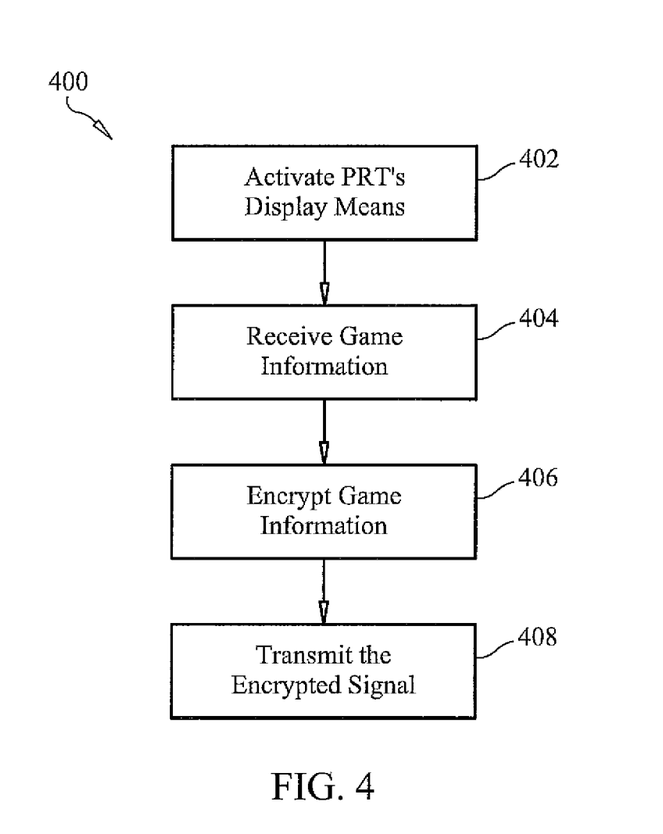
FIG. 4 shows an exemplary method according to one embodiment.

FIG. 4 shows a flowchart representing a method 400 in accordance with one embodiment. In one embodiment, method 400 comprises of using a processor 302 to do, or perform, at least one of the following: activate the PRT's display means 304 (step 402) to input a sketch or text of the game information 306 e.g. the text "STRIKE", receive game information (step 404), encrypt the game information 306 forming an encrypted signal 204 containing game information 306 (step 406) and transmit the encrypted signal 204 containing game information 306 (step 408) to at least one PRT 300.

Activating the PRT's display means 304 (step 402) may include an activation button 312, which may be used to at least one of, activate and reactivate the display means 304. PRT 300 may also be activated by voice commands in which event speech recognition means (not shown) converts the voice commands to activate the PRT 300. Additionally, the PRT 300 may be activated using touch screen technology, where by touching the screen various functionalities of the PRT 300 can be activated and/or employed. In either event, the processor 302 receives the text or sketch of the game information 306 (step 404), encrypts the game information 306 (step 406), and transmits the encrypted signal 204 containing the game information 306 to another referee on or off the field (step 408). By encrypting the game information 306 for transmission, the game information 306 is secured and not susceptible to tampering or interference.

Figure 5:
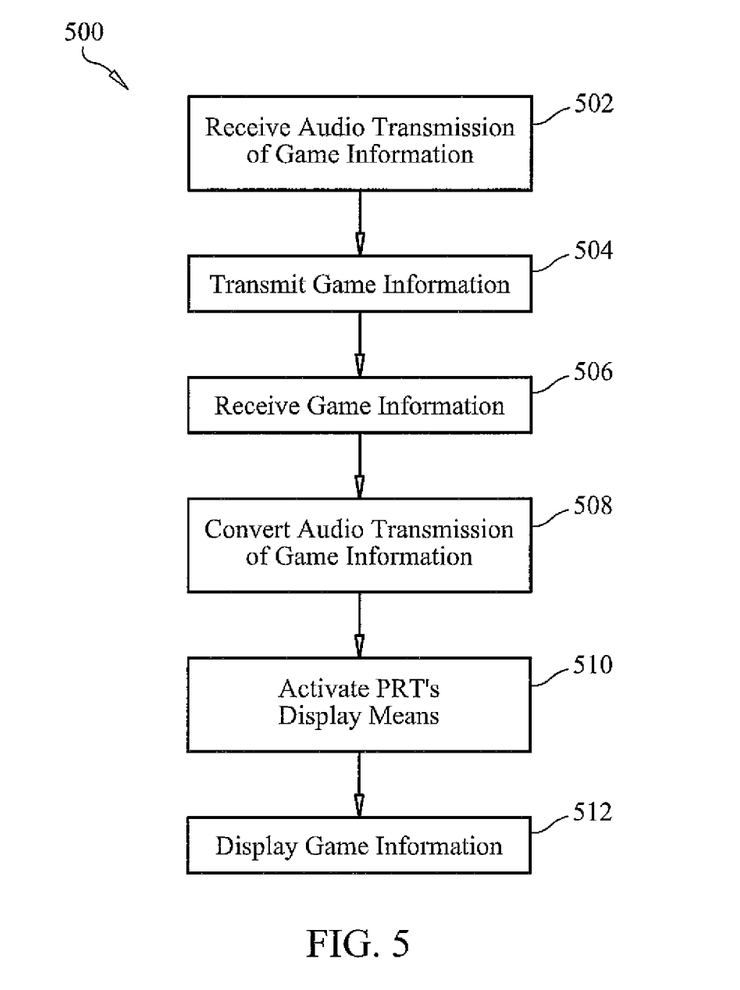
FIG. 5 shows an exemplary method according to one embodiment.

FIG. 5 shows a flowchart representing a method 500 in accordance with one embodiment, wherein a referee may use his communications unit 104 to audibly transmit game information 306 to be displayed on one or a plurality of referees' PRTs 300, 300'. In that embodiment, communications unit 104 receives audio transmission of game information 306 (step 502); transmits audio transmission of game information 306 (step 504) to a secondary communications unit 104' that is in communication with at least one secondary PRT 300', where the secondary PRT's communications means 308' (not shown) receives the audio transmission of game information 306 (step 506). The secondary PRT's speech recognition means converts the audio transmission of game information 306 (step 508) into digital format; secondary PRT's processor 302' activates the secondary PRT's display means 304' (step 510) for displaying the game information 306 (step 512) thereon.

Figure 6:
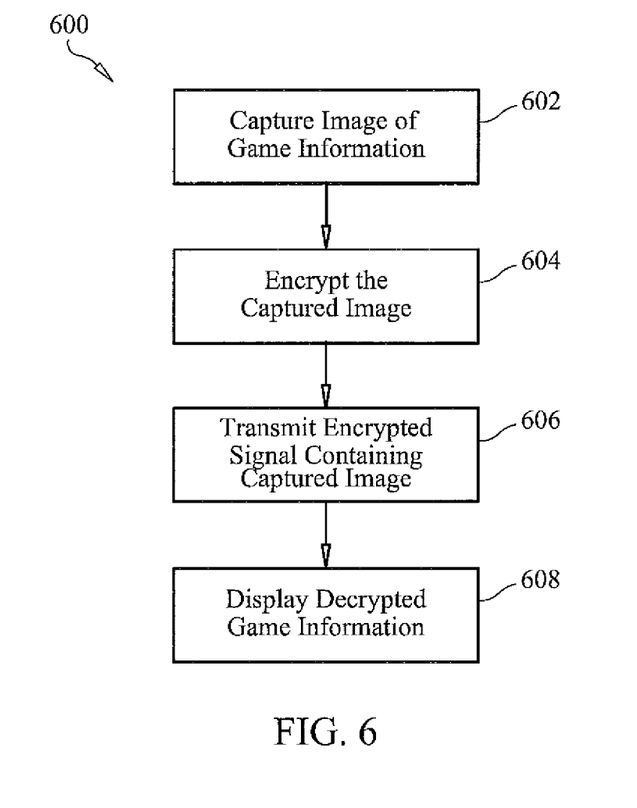
FIG. 6 shows an exemplary method according to one embodiment.

FIG. 6 shows a flowchart representing a method 600 in accordance with one embodiment. In one embodiment, method 600 comprises of using a processor 302 to do, or perform, at least one of the following: capture at least one image of game information 306 (step 602), encrypt the captured image of game information 306 (step 604) forming an encrypted signal 204 containing game information 306 and transmit the encrypted signal 204 (step 606) containing the captured image of game information 306 to a PRT, where the game information 306 is decrypted for display of the decrypted game information 306 on a PRT's display means 304 (step 608). In some embodiments, capturing at least one image of game information (step 602) may include using at least one or a plurality of camera 206, 206' to capture at least one image of game information 306 from a plurality of angles.

In other embodiments, displaying the decrypted game information 306 on a display means 304 (step 608) may comprise of converting the at least one image of game information 306 into at least one 3D model. In a further embodiment, method 600 may comprise converting the at least one image of game information 306 into at least one manipulatable 3D model. In a further embodiment, method 600 may comprise converting the at least one image of game information 306 into a 2D model. In yet a further embodiment, method 400 may comprise converting the at least one image of game information 306 into a manipulatable 2D model.

In some embodiments, converting the at least one image of game information 306 may include analyzing the image, recognizing objects in the image, such as players and the like, and then converting the image along with the objects into a computer model, which in some cases, may be manipulatable. In such cases, the objects may be moved throughout the computer model by a user through a control means, such as any of the control means described above. For example, such manipulation may be as simple as moving the object through the model, as displayed on a display means 304, by touching and dragging the object with a stylus or click and dragging the object with a mouse.

In some embodiments, displaying the decrypted game information 306 on a display means 304 may comprise displaying at least one 3D model, which may include a manipulatable 3D model, on a display means 304. In other embodiments, displaying the decrypted game information 306 on a display means 304 may comprise displaying at least one 2D model, which may include a manipulatable 2D model, on a display means 304.

In yet a further embodiment, method 600 may include allowing for the decrypted game information 306 to be manipulated on a display means 304. In some embodiments, such manipulation may include clicking and rearranging the image, manipulating objects within the image and/or model, and/or creating animations based on the image, such as by, but not limited to, moving the objects to desired positions, and then animating the movements. Such manipulation may include, but is not limited to, creating new objects, or deleting objects, within an image and/or model, which may include, but is not limited to, writing information, highlighting boundaries, and the like.

Hardware and Operating Environment

This section provides an overview of example hardware and the operating environments in conjunction with which embodiments of the inventive subject matter can be implemented.

A software program may be launched from a computer readable medium in a computer-based system 200 to execute the functions defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment.

Figure 7:
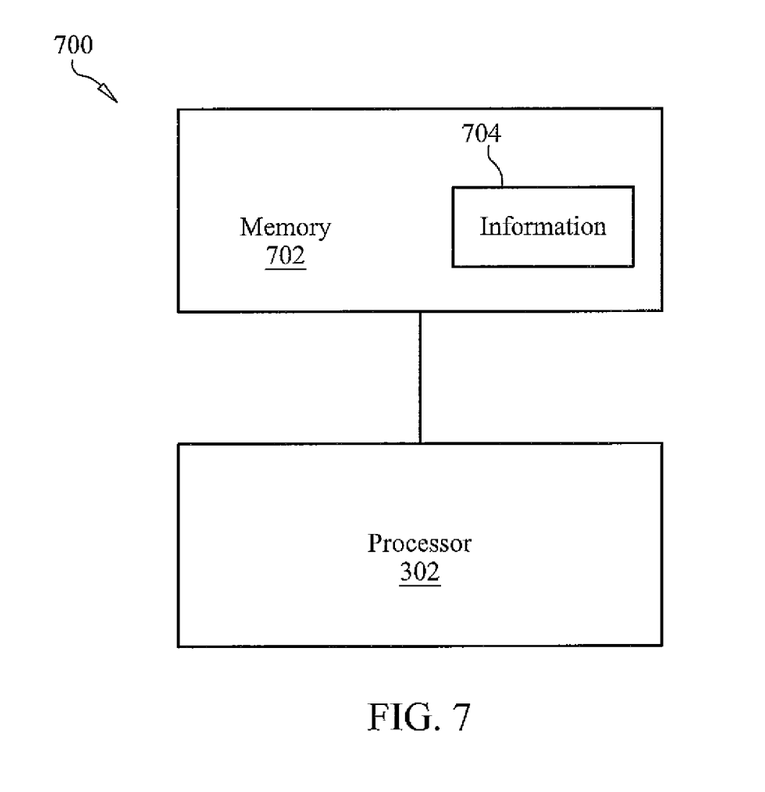
FIG. 7 is a block diagram representing an article according to various embodiments.

FIG. 7 is a block diagram representing an article 700 according to various embodiments. Such embodiments may comprise a computer, a memory system, a magnetic or optical disk, some other storage device, or any type of electronic device or system 200. The article 700 may include one or more processor(s) 302 coupled to a machine-accessible medium such as a memory 702 (e.g., a memory including electrical, optical, or electromagnetic elements). The medium may contain associated information 704 (e.g., computer program instructions, data, or both) which, when accessed, results in a machine (e.g., the processor(s) 302) performing the activities previously described herein.

The principles of the present disclosure may be applied to all types of computers, systems, and the like, include desktop computers, servers, notebook computers, personal digital assistants, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. An apparatus comprising of:
(a) an article of headwear; and
(b) at least one communications unit attached to the article of headwear configured for communicating within a private network, in-game referee communications concerning game information with at least one portable remote unit that is operative for encrypting the in-game referee communications concerning game information creating an encrypted signal containing the game information for transmission to a secondary portable remote unit where the in-game referee communications concerning game information is decrypted for displaying the decrypted in-game referee communications concerning game information on the secondary portable remote unit's display means during a game being played on a field for another referee's review.

2. The apparatus of claim 1, wherein the article of headwear is any one or more of the following: a helmet, a hat, a headband, a mask, a cap, a hood, a referee's helmet, and goggles.

3. The apparatus of claim 1, wherein the at least one communications unit is affixed to the at least one article of headwear in any one of the following manner: detachably, semi-permanently or permanently.

4. The apparatus of claim 1, wherein game information includes any one or more of the following: prior referee calls, image, a video, a sound, a text, a play call, a referee ruling, an instant replay, field event on the field, field event off the field.

5. The apparatus of claim 1, wherein the at least one communications unit comprises of means for communicating wirelessly.

6. The apparatus of claim 1, wherein the at least one communications unit comprises: (a) at least one microphone connected to the at least one communications unit; and (b) at least one speaker connected to the at least one communications unit.

7. The apparatus of claim 1, wherein the at least one communications unit is operative to act as a relay transmitter of the encrypted signal containing the game information, where the encrypted signal may be routed via the communications unit to secondary portable remote unit.

8. The apparatus of claim 1, wherein the at least one communications unit is operative to communicate using a short range wireless protocol, wherein the short range wireless protocol includes any one or more of the following: WIHLON™, BLUETOOTH®, ZIGBEE, and 802.11 series.

9. The apparatus of claim 1, wherein the at least one communications unit is configured for communicating with a secondary communications unit attached to a
(a) at least one microphone connected to the at least one communications unit; and
(b) at least one speaker connected to the at least one communications unit secondary article of headwear.

10. The apparatus of claim 1, wherein the article of head wear may include a soundproofing element which may include any one of the following: soundproofing foam, such as memory foam and acoustic foam, polystyrene foam, neoprene, or silicone.

11. A system comprising of:
(a) at least one article of headwear;
(b) at least one communications unit attached to the at least one article of headwear; and
(c) at least one portable remote terminal configured for communicating within a private network in-game referee communications concerning game information with the at least one communications unit and is operative for encrypting the in-game referee communications concerning game information creating an encrypted signal containing the game information for transmission to a secondary portable remote unit where the in-game referee communications concerning game information is decrypted for displaying the decrypted in-game referee communications concerning game information on the secondary portable remote unit's display means during a game being played on a field for another referee's review.

12. The system of claim 11, further comprising of at least one camera operative to capture at least one image of game information to be viewed on at least one portable remote unit.

13. The system of claim 11, wherein the game information is any one or more of the following: prior referee calls, an image, a video, a sound, a text, a play call, a referee ruling, and an instant replay, field event on the field, field event off the field.

14. The system of claim 11, wherein the at least one article of headwear is any one or more of the following: a helmet, a hat, a headband, a mask, a cap, a hood, a referee's helmet, and goggles.

15. The system of claim 11, the at least one communications unit is affixed to the at least one article of headwear in any one of the following manner: detachably, semi-permanently or permanently.

16. The system of claim 11, wherein the at least one portable remote terminal is in communication with the at least one communications unit in any of the following manner: wired or wirelessly.

17. The system of claim 11, wherein the at least one communications unit comprises:
(a) at least one microphone connected to the at least one communications unit; and
(b) at least one speaker connected to the at least one communications unit.

18. The system of claim 11, wherein the at least one communications unit is operative to act as a relay transmitter of the encrypted signal containing the game information, where the encrypted signal may be routed via the communications unit to secondary portable remote unit.

19. The system of claim 11, wherein the at least one communications unit is adapted to communicate using a short range wireless protocol, wherein the short range wireless protocol includes any one or more of the following: WIHLON™, BLUETOOTH®, ZIGBEE, and 802.11 series.

20. The system of claim 11, wherein the at least one communications unit is configured for communicating with a secondary communications unit attached to a secondary article of headwear.

21. The system of claim 11, wherein the at least one portable remote terminal includes any one or more of the following: a central processing unit, a portable processing unit, at least one display means, or alarm means.

22. The system of claim 11, wherein the at least one portable remote terminal further comprising computer executable instructions readable by a processor and operative to transmit and receive game information.

23. The system of claim 21, wherein the at least one display means is configured for displaying game information in any one or more of the following formats: graphic images, text or audio.

24. The system of claim 21, wherein the at least one display means is configured for being automatically activated upon receipt of game information for displaying an image.

25. The system of claim 24, wherein the image may be a virtual or an actual image of an instant replay of a field event.

26. The system of claim 21, wherein the alarm means is operative to generate an alert of an incoming transmission of game information.

27. A method comprising:
  (a) capturing at least one image of game information;
  (b) encrypting the captured image of game information forming an encrypted signal containing game information;
  (c) transmitting the encrypted signal containing the captured image of in-game referee communications concerning game information to a portable remote terminal within a private network that is in electronic communication with at least one communications unit attached to an article of headwear, where the in-game referee communications concerning game information is decrypted for displaying the decrypted game information on the portable remote terminal display means; and
  (d) displaying the image of the in-game referee communications concerning game information on a portable remote terminal's display means during a game being played on a field for another referee's review.

28. The method of claim 27 wherein game Information includes any one or more of the following: prior referee calls, image, a video, a sound, a text, a play call, a referee ruling, an instant replay, field event on the field, field event off the field.

29. The method of claim 27, further comprising of providing computer executable instructions operative to perform any one or more of the following:
  (a) transmit the captured image of the in-game referee communications concerning game information from camera to display means;
  (b) take a snap shot, or a still image, from a video captured by camera;
  (c) convert the captured image into a computer model, wherein the computer model may be manipulated into a computer model;
  (d) analyze the captured image of game information from camera;
  (e) generate a computer model based on the captured image;
  (f) recognize the subjects of the image; and
  (g) convert those subjects into manipulatable objects in the computer model.

30. A method comprising:
  (a) activating the portable remote unit's display means to input a sketch or text of the game information;
  (b) receiving the game information;
  (c) encrypting the game information forming an encrypted signal containing game information; and
  (d) transmitting the encrypted signal containing in-game referee communications concerning game information to at least one secondary portable remote unit within a private network that is in electronic communication with at least one communications unit attached to an article of headwear, where the in-game referee communications concerning game information is decrypted for displaying the decrypted in-game referee communications concerning game information during a game being played on a field.

31. The method of claim 30, wherein game information includes any one or more of the following: prior referee calls, image, a video, a sound, a text, a play call, a referee ruling, an instant replay, field event on the field, field event off the field.

32. A method comprising:
  (a) receiving audio transmission of in-game referee communications concerning game information from a communication unit, attached to an article of headwear, that is configured for communicating in a private network with at least one portable remote unit that is operative for receiving the in-game referee communications concerning in-game information during a game being played on a field; and
  (b) transmitting the audio transmission of the in-game referee communications concerning game information to a secondary communications unit that is in communication with the at least one portable remote unit where the in-game communications concerning game information is displayed.

33. The method of claim 32 further comprising:
  (a) receiving audio transmission of game information by the portable remote unit from the communication unit;
  (b) converting the audio transmission of the game information into digital format;
  (c) activating display means for displaying the game information during a game being played on the field; and
  (d) displaying the game information thereon.

34. The method of claim 32, wherein game information includes any one or more of the following: prior referee calls, image, a video, a sound, a text, a play call, a referee ruling, an instant replay, field event on the field, field event off the field.

* * * * *